US008115098B2

(12) United States Patent
Jones et al.

(10) Patent No.: US 8,115,098 B2
(45) Date of Patent: Feb. 14, 2012

(54) HINGE SYSTEM AND METHOD

(75) Inventors: Trent Jones, White Bear Lake, MN (US); Jeremy Fink, Anoka, MN (US)

(73) Assignee: Hoffman Enclosures, Inc., Anoka, MN (US)

( * ) Notice: Subject to any disclaimer, the term of this patent is extended or adjusted under 35 U.S.C. 154(b) by 282 days.

(21) Appl. No.: 12/568,304

(22) Filed: Sep. 28, 2009

(65) Prior Publication Data

US 2010/0084154 A1 Apr. 8, 2010

Related U.S. Application Data

(60) Provisional application No. 61/100,712, filed on Sep. 27, 2008.

(51) Int. Cl.
*H02G 3/08* (2006.01)

(52) U.S. Cl. ................ 174/50; 174/58; 174/61; 174/53; 16/230; 312/218; 211/134

(58) Field of Classification Search .................... 174/50, 174/53, 58, 61, 64; 16/230; 312/218; 211/134
See application file for complete search history.

(56) References Cited

U.S. PATENT DOCUMENTS

| | | | |
|---|---|---|---|
| 726,577 | A | 4/1903 | Schiek |
| 3,143,760 | A | 8/1964 | Ferguson |
| 3,564,112 | A | 2/1971 | Algotsson et al. |
| 3,654,663 | A | 4/1972 | Algotsson |
| 3,666,134 | A | 5/1972 | Rauch |
| 3,671,998 | A | 6/1972 | Ruiz |
| 3,786,534 | A | 1/1974 | Ferguson |
| 3,848,918 | A | 11/1974 | Dyer |
| 3,977,044 | A | 8/1976 | Mort |
| 4,178,657 | A | 12/1979 | Way |
| 4,455,711 | A | 6/1984 | Anderson |
| 4,470,623 | A | 9/1984 | Judge, Jr. |
| 4,495,672 | A | 1/1985 | Adams |
| 4,570,290 | A | 2/1986 | Anderson |
| 4,592,604 | A | 6/1986 | Wilke |
| 4,594,750 | A | 6/1986 | Carcas |
| 4,667,367 | A | 5/1987 | White et al. |
| 4,671,015 | A | 6/1987 | Curry et al. |
| 5,272,279 | A | 12/1993 | Filshie |
| 5,367,828 | A | 11/1994 | Hashemnia |
| 5,651,164 | A | 7/1997 | DeMarco |
| 5,926,916 | A | 7/1999 | Lee et al. |
| 5,940,937 | A | 8/1999 | Churchill et al. |
| 6,070,293 | A | 6/2000 | Schreiber |
| 6,283,565 | B1 | 9/2001 | Kohler et al. |
| 6,469,247 | B1 | 10/2002 | Dodds et al. |
| 6,642,446 | B2 | 11/2003 | Dodds et al. |
| 6,814,244 | B1 | 11/2004 | Hathcock |
| 6,838,616 | B2 | 1/2005 | Harrison et al. |

(Continued)

*Primary Examiner* — Dhiru R Patel
(74) *Attorney, Agent, or Firm* — Quarles & Brady LLP

(57) ABSTRACT

Embodiments of the invention provide a hinge system and method for use with an electrical enclosure. The hinge system can include a first mounting plate having a bushing and a second mounting plate having an aperture. The hinge system can include a pin having a first portion received by the bushing and a second portion selectively received by the aperture. The hinge system can include a cam lever, which can extend from the first mounting plate at an angle. The cam lever can be moveable between a first position to retract the pin from the aperture and a second position to lock the pin in the aperture. The cam lever can be operable in a substantially single plane of motion.

20 Claims, 5 Drawing Sheets

U.S. PATENT DOCUMENTS 6,842,349 B2 1/2005 Wrycraft et al.
6,848,916 B2 * 2/2005 Nakayama et al. .......... 439/76.2
7,131,711 B2 11/2006 Chen
7,276,659 B2 * 10/2007 Thrift et al. ..................... 174/50
7,304,238 B1 12/2007 Shotey et al.
D576,015 S 9/2008 Lange
2003/0020379 A1 1/2003 Larsen et al.
2003/0121928 A1 7/2003 Chou
2007/0210681 A1 9/2007 Adducci et al.
2007/0251056 A1 11/2007 Aoyagi
2008/0053677 A1 3/2008 Johnson
2008/0110661 A1 5/2008 Dinh

* cited by examiner

HINGE SYSTEM AND METHOD

RELATED APPLICATIONS

This application claims priority under 35 U.S.C. §119 to U.S. Provisional Patent Application No. 61/100,712 filed on Sep. 27, 2008, the entire contents of which is incorporated herein by reference.

BACKGROUND

Hinges are used to rotationally connect two parts, such as a door and a frame. For easy installment and removal, the hinge can include a separable connection using retractable pins. One conventional hinge system requires the operator to access a mechanism on both sides of the hinge system to retract the pins. This limits the location where such a hinge system can be installed. In other conventional hinge systems, two sets of mounting plates can be used on either side of the frame so that the door can be attached to either side. However, these hinge systems require additional mounting plates that are not used once the mounting location for the door is chosen.

SUMMARY

Some embodiments of the invention provide a retractable hinge system for use with an electrical enclosure. The hinge system can include a first mounting plate, a second mounting plate, a pin, and a cam lever. The first mounting plate can include a bushing, the second mounting plate can include an aperture. A first portion of the pin can be received by the bushing and a second portion of the pin can be selectively received by the aperture. The cam lever can extend from the first mounting plate at an angle. The angle being greater than about 45 degrees. The cam lever can move between a first position to retract the pin from the aperture and a second position to lock the pin in the aperture. The cam lever can be operable in a substantially single plane of motion.

DETAILED DESCRIPTION

Figure 1:
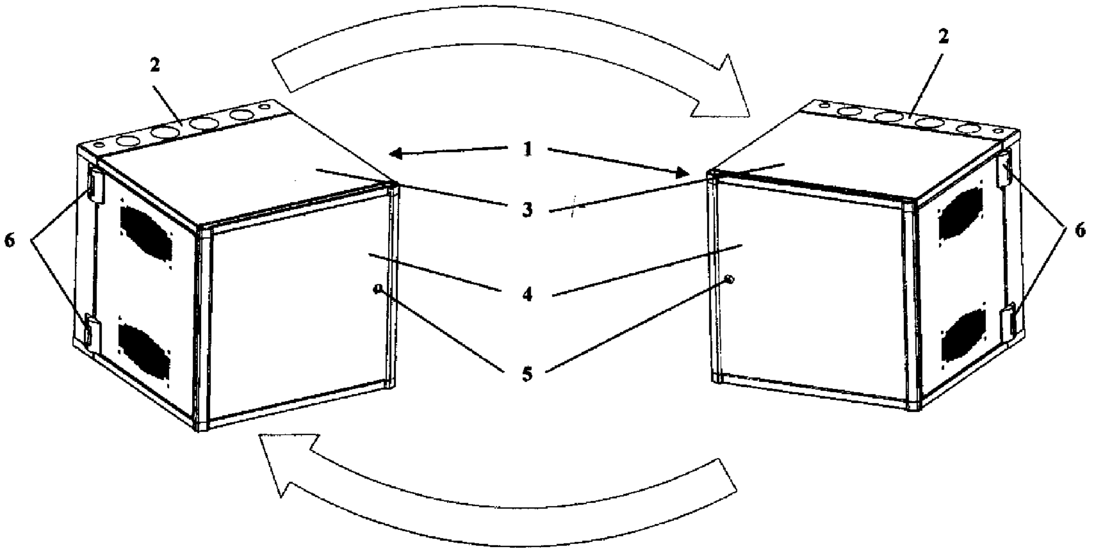
FIG. 1 is a perspective view of an electrical enclosure mounted in two different positions, the electrical enclosure includes a hinge system according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

FIG. 1 illustrates an electrical enclosure 1 according to one embodiment of the invention. The electrical enclosure 1 can include a back section 2, a frame 3, a door 4, a latch 5, and a hinge system 6. The back section 2 can be mounted to a wall. A single person can align the frame 3 with the back section 2 and can operate the hinge system 6 to secure the frame 3 to the back section 2 without the use of tools or the help of a second person.

In some embodiments, the electrical enclosure 1 can be mounted in at least two different orientations depending on the configuration of the hinge system 6. The hinge system 6 can be used on one side of the electrical enclosure 1 without restricting to which side the electrical enclosure 1 can open. In other words, the hinge system 6 can be permanently mounted to one side of the electrical enclosure 1, and the electrical enclosure 1 can be rotated 180° to engage the back section 2 with a wall or other suitable structure. As a result, the electrical enclosure 1 can open within a given space on the wall or other suitable structure, for example, near a corner, pillar, and other obstructions.

Figure 2:
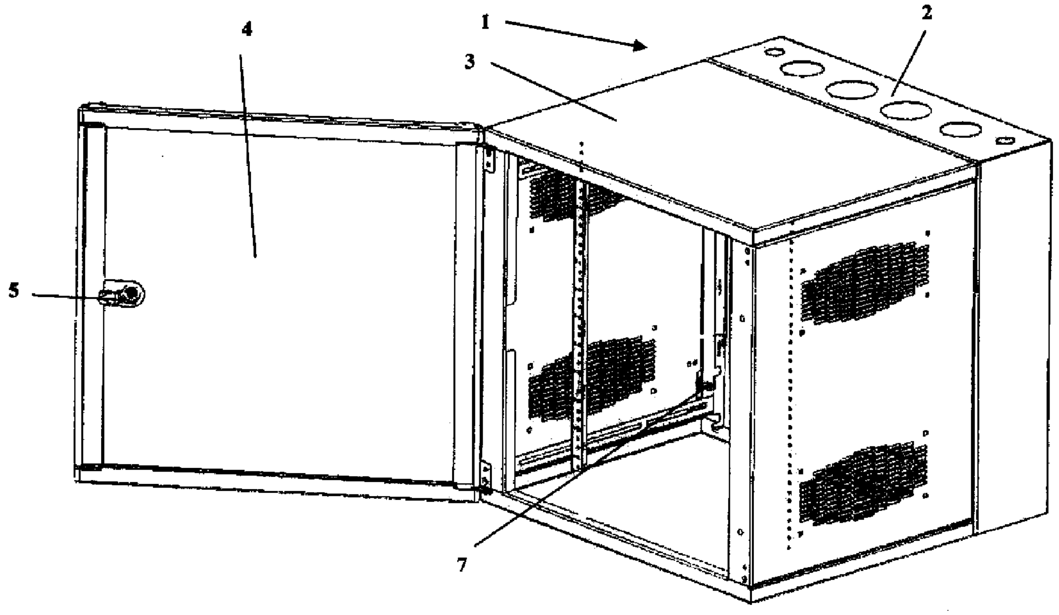
FIG. 2 is a perspective view of an electrical enclosure including a hinge system with a cam lever located inside the electrical enclosure.

FIG. 2 illustrates the electrical enclosure 1 with the door 4 open after the frame 3 has been aligned with the back section 2 and secured by the hinge system 6. The hinge system 6 can include a handle 7. In some embodiments, the handle 7 can be located inside the electrical enclosure 1 so that it is accessible by the person installing the electrical enclosure 1, and so that the vertical rotation of the frame 3 with respect to the back section 2 is not obstructed. In some embodiments, the hinge system 6 can be mounted on an outside of the electrical enclosure 1 and the handle 7 can protrude into an interior space of the electrical enclosure 1.

Figure 3:
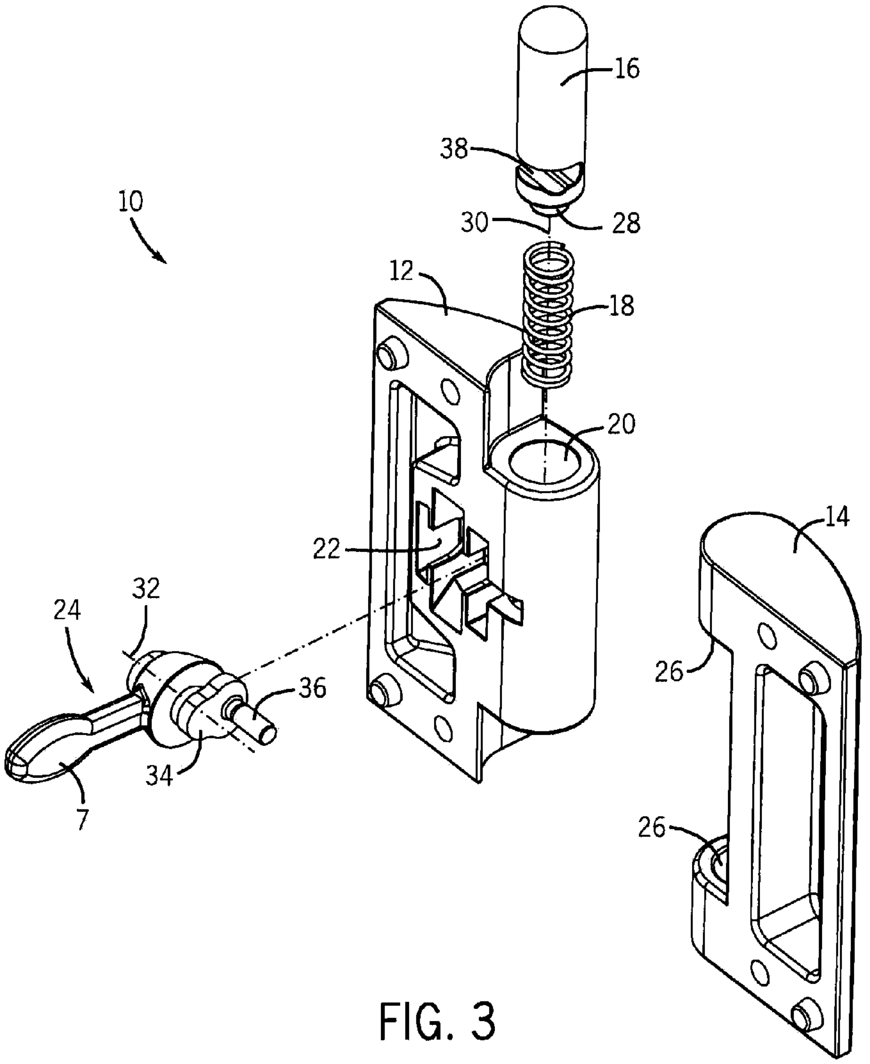
FIG. 3 is an exploded perspective view of a single-pin hinge system according to one embodiment of the invention.

FIG. 3 illustrates a single-pin hinge system 10 according to one embodiment of the invention. The single-pin hinge system 10 can be one embodiment of the hinge system 6. The single-pin hinge system 10 can include a first hinge plate 12, a second hinge plate 14, a single pin 16, a spring 18, a bushing 20, a housing 22, and a cam lever 24. The pin 16 can be received by the second hinge plate 14 in an aperture 26. In some embodiments, the first hinge plate 12 and the second hinge plate 14 can be mounted to the electrical enclosure 1 by fasteners or other suitable methods. The pin 16 together with the spring 18, which can be held in position by a stub 28 of the pin 16, can be inserted into the bushing 20 and can form a first axis of rotation 30. The pin 16 can be moved by the cam lever 24, which can be mounted in the housing 22 and can be rotated on a second axis of rotation 32, which can result in a substantially single plane of motion for the cam lever 24. The cam lever 24 can include the handle 7 and an eccentric plate 34. The eccentric plate 34 can include an extension 36 offset from the second rotational axis 32 of the cam lever 24. The eccentric plate 34 and/or the extension 36 can be used to lock the cam lever 24 in an open position or a closed position. The extension 36 can be received by a slot 38 in the pin 16. The extension 36 can rotate within the slot 38 to move the pin 16 by a sliding motion in the bushing 20.

Figure 4:
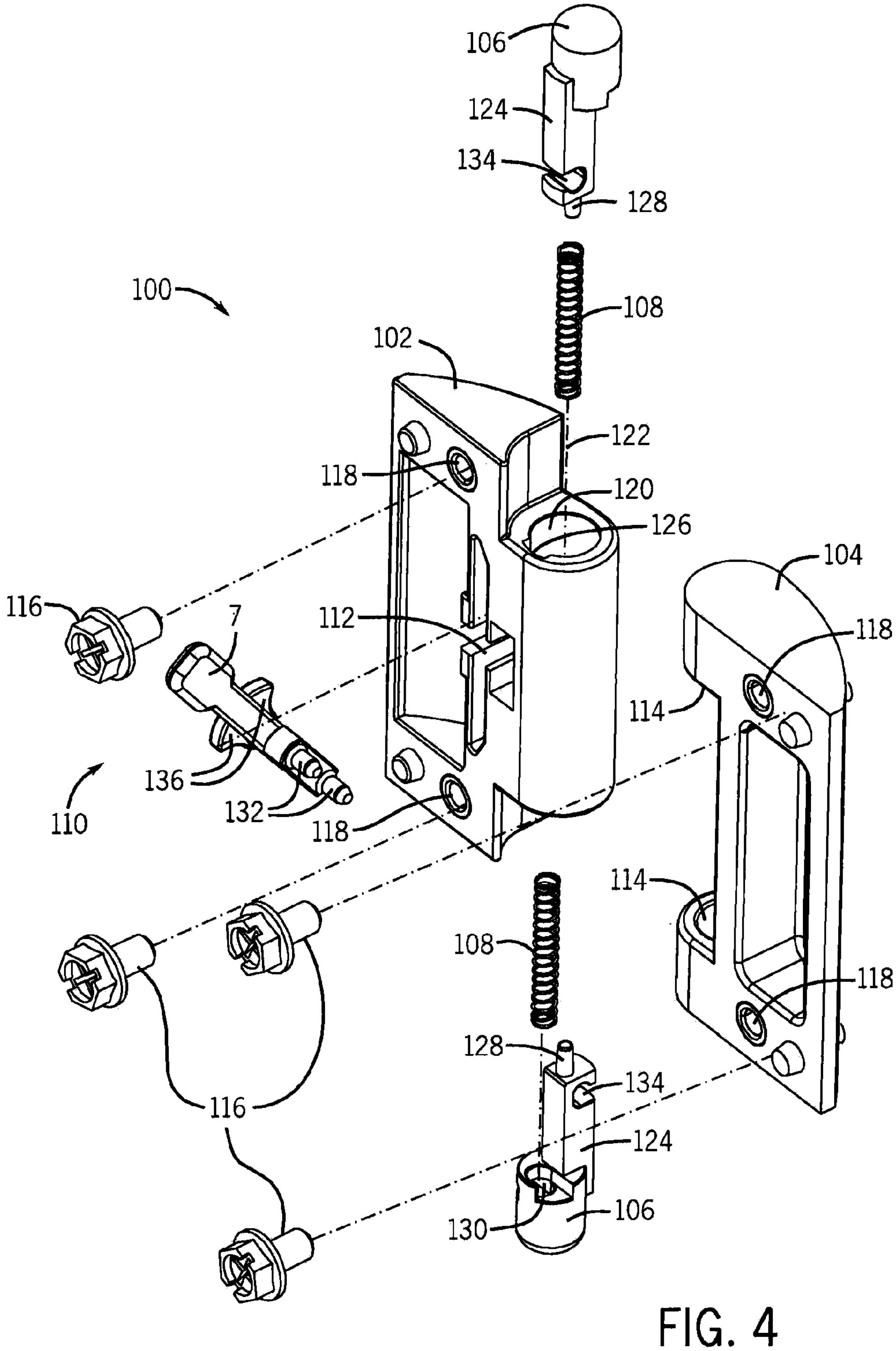
FIG. 4 is an exploded perspective view of a dual-pin hinge system according to one embodiment of the invention.

FIG. 4 illustrates a dual-pin hinge system 100 according to one embodiment of the invention. The dual-pin hinge system 100 can be one embodiment of the hinge system 6. The dual-pin hinge system 100 can include a first hinge plate 102, a second hinge plate 104, two pins 106, a spring 108, and a cam lever 110. The first hinge plate 102 can receive the two pins 106 and the cam lever 110 in a housing 112. The two pins 106 can be at least partly received by the second hinge plate 104 in apertures 114. The first hinge plate 102 and the second hinge plate 104 can be mounted to the electrical enclosure 1 by fasteners, such as screws 116 secured in holes 118. The two pins 106 together with the spring 108 can be inserted into a bushing 120 and can form a first axis of rotation 122. In some embodiments, the two pins 106 can include a sledge 124, which can fit into a slot 126 of the bushing 120. The slot 126 can provide guidance during operation of the two pins 106. In some embodiments, the spring 108 can extend from a stub 128 positioned on the bottom of the sledge 124 to be received by a fitting 130 in the head of the two pins 106.

In some embodiments, the two pins 106 can be substantially simultaneously operated by the cam lever 110, which can be mounted in the housing 112 and can be rotated on a second axis of rotation, which can result in a substantially single plane of motion for the cam lever 110. In some embodiments, the cam lever 110 includes the handle 7 and two extensions 132, one extension 132 interlocking in each pin 106 through a slot 134. The two pins 106 can move in a sliding motion in opposite directions when the cam lever 110 is rotated. The cam lever 110 can include two stops 136, which can be used to lock the cam lever 110 in an open position or a closed position.

Figures 5A, 5B:
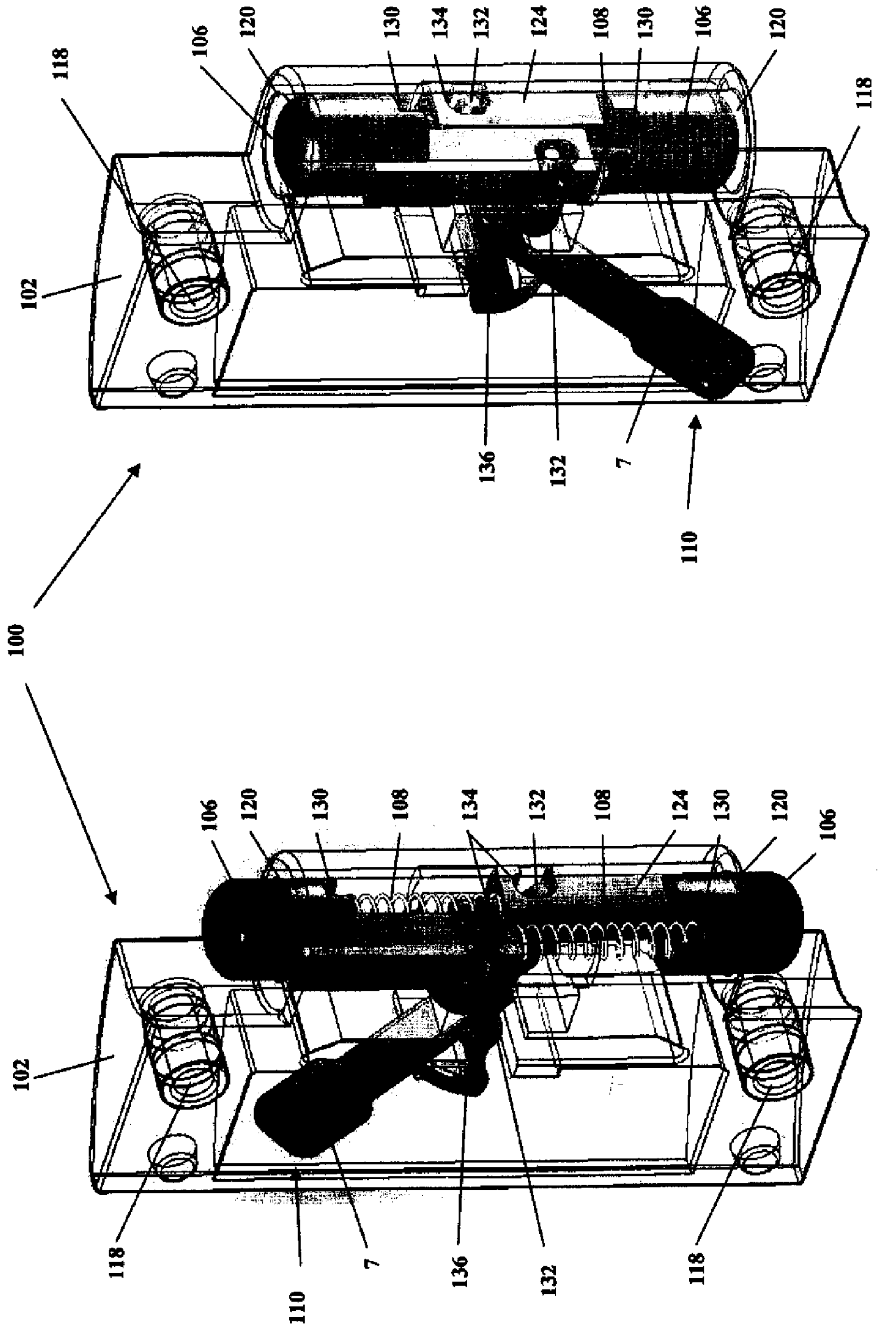
FIG. 5A is a perspective view of the dual-pin hinge system of FIG. 4 with the cam lever in a closed position.
FIG. 5B is a perspective view of the dual-pin hinge system of FIG. 4 with the cam lever in an open position.

FIG. 5A illustrates the dual-pin hinge system 100 with the cam lever 110 in the closed position. The two pins 106 can extend beyond the bushing 120 to be received by the aperture 114 of the second hinge plate 104 (as shown in FIG. 4). The first hinge plate 102 and second hinge plate 104 are therefore interconnected and can be moved about the first axis of rotation 122 with respect to each other.

FIG. 5B illustrates the dual-pin hinge system 100 with the cam lever 110 in the open position. The two pins 106 can be recessed within the bushing 120. The first hinge plate 102 and second hinge plate 104 may be not connected and can be displaced with respect to each other. In some embodiments, the cam lever 110 can enable a removal of the frame 3 of the electrical enclosure 1 from the back section 2.

Figure 6:
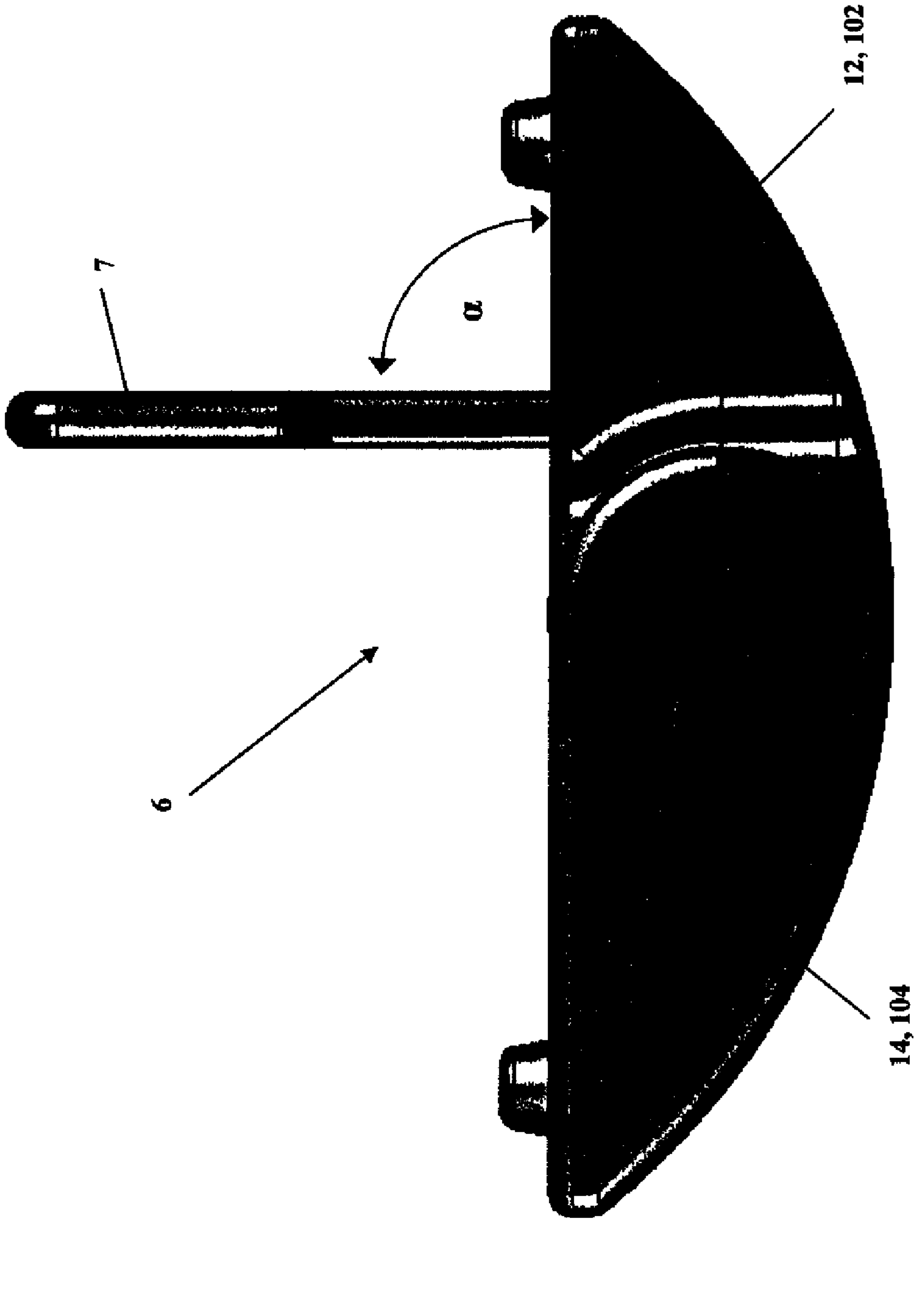
FIG. 6 is a top view of the hinge system of FIG. 3 or FIG. 4.

FIG. 6 illustrates a top view of the hinge system 6. The handle 7 can extend from the first hinge plate 12, 102 at an angle α. In some embodiments, the angel a can be an acute angle (less than about 90 degrees but greater than about 45 degrees) or, in one embodiment, about 90 degrees. During rotation of the handle 7, the angle α can remain constant so that the handle 7 can be operated within a substantially single plane of motion. In some embodiments, the handle can extend substantially perpendicular to one or both of the first hinge plate 12, 102 and the second hinge plate 14, 104.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. Various features and advantages of the invention are set forth in the following claims.

The invention claimed is:

1. A retractable hinge system for use with an electrical enclosure, the hinge system comprising:

a first mounting plate including a bushing;

a second mounting plate including an aperture;

a pin having a first portion received by the bushing and a second portion selectively received by the aperture; and a cam lever extending from the first mounting plate at an angle, the cam lever being moveable between a first position to retract the pin from the aperture and a second position to lock the pin in the aperture, the cam lever being operable in a substantially single plane of motion, the angle being greater than about 45 degrees.

2. The hinge system of claim 1, and further comprising a spring and a stub positioned on the pin, the stub receiving the spring.

3. The hinge system of claim 1, and further comprising a slot and an extension engaging the slot, the extension being offset from a first axis of rotation of the cam lever.

4. The hinge system of claim 1, wherein the second hinge plate includes two apertures and each one of the two apertures receives a portion of the pin.

5. The hinge system of claim 1, wherein the hinge system enables the electrical enclosure to be mounted in a first orientation and a second orientation that is rotated about 180 degrees from the first orientation.

6. The hinge system of claim 1, wherein the cam lever is rotated between the first position and the second position.

7. The hinge system of claim 1, wherein the angle is about 90 degrees.

8. A dual pin hinge system for use with an electrical enclosure, the hinge system comprising:

a first mounting plate including a bushing;

a second mounting plate including two apertures;

two pins, each one of the two pins having a first portion received by the bushing and a second portion selectively received by one of the two apertures; and a cam lever extending from the first mounting plate at an angle, the cam lever being moveable between a first position to retract the two pins from at least one of the two apertures and a second position to lock the two pins in at least one of the two apertures, the cam lever being operable in a substantially single plane of motion, the angle being greater than about 45 degrees.

9. The hinge system of claim 8, wherein the two pins are substantially simultaneously moved by the cam lever.

10. The hinge system of claim 8, and further comprising a slot and a sledge, the two pins each including the sledge, the slot positioned in the bushing, the slot receiving the sledge.

11. The hinge system of claim 10, wherein the sledge of one of the two pins overlaps the sledge of the other of the two pins inside the bushing in at least one position of the two pins.

12. The hinge system of claim 10, and further comprising at least one spring and a stub positioned on the two pins, the at least one spring being received by the stub of each of the two pins.

13. The hinge system of claim 8, wherein the two pins each include a slot and the cam lever includes a first extension and a second extension, the first extension received by the slot of one of the two pins and the second extension received by the slot of the other of the two pins.

14. The hinge system of claim 8, wherein the cam lever includes a handle accessible from an interior space of the electrical enclosure.

15. The hinge system of claim 8, wherein the cam lever includes at least one stop locking the cam lever in an open position or a closed position.

16. The hinge system of claim 8, wherein the electrical enclosure is configured to be mounted in a first orientation and a second orientation that is rotated about 180 degrees from the first orientation.

17. The hinge system of claim 8, wherein the cam lever is rotated between the first position and the second position.

18. The hinge system of claim 8, wherein the angle is about 90 degrees.

19. An electrical enclosure comprising:

a back section including a first mounting plate; a frame including a second mounting plate; and a hinge system coupled to the back section and the frame, the hinge system including at least one pin and a cam lever moveable to retract the at least one pin from one of the first mounting plate and the second mounting plate, the cam lever extending from the hinge system at angle greater than about 45 degrees, wherein the cam lever includes a handle accessible from an interior space of the electrical enclosure, the cam lever accessible from the interior space of the electrical enclosure, the cam lever moveable in a substantially single plane of motion.

20. The electrical enclosure of claim 19, wherein the electrical enclosure is configured to be mounted in a first orientation and a second orientation that is rotated about 180 degrees from the first orientation.

* * * * *